UNITED STATES PATENT OFFICE.

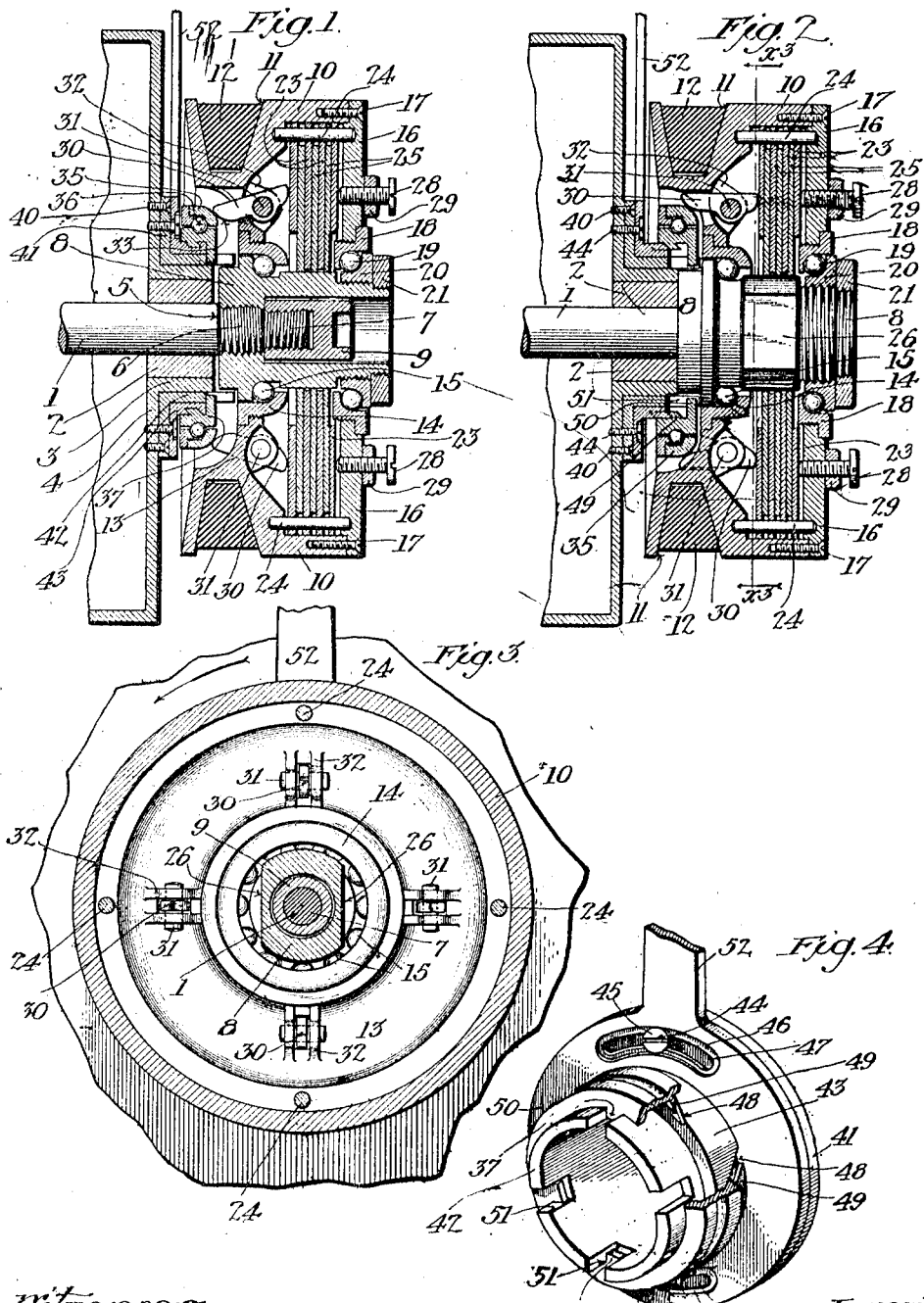

FRANK S. JONES, OF PASADENA, CALIFORNIA.

CLUTCH.

1,018,620.

Specification of Letters Patent.   Patented Feb. 27, 1912.

Application filed December 29, 1910.   Serial No. 599,955.

*To all whom it may concern:*

Be it known that I, FRANK S. JONES, a citizen of the United States, residing at Pasadena, in the county of Los Angeles and State of California, have invented a new and useful Clutch, of which the following is a specification.

This invention relates to improvements in clutches of the general class known as friction disk clutches, and one of the main objects of the present invention is to construct a device of the character described especially adapted for use on motor cycles or similar vehicles in which it is desirable to permit the engine to run free without transmitting power to the wheels.

Another object of the invention is to construct a device of the character described of simple and economical construction and efficient in operation.

Other objects and advantages will appear hereinafter from the following description.

Referring to the drawings, which are for illustrative purposes only: Figure 1 is a longitudinal sectional view of a clutch embodying a form of my invention, showing the clutch in inoperative position. Fig. 2 is a view similar to Fig. 1, showing the clutch in operative position. Fig. 3 is a transverse sectional view on line $x^3$—$x^3$ Fig. 2. Fig. 4 is a perspective view of a portion of the clutch operating mechanism.

1 designates the engine shaft mounted in a bushing 2 in an extension 3 of the crank case 4. The shaft 1 is provided with a shoulder 5 and threaded portion 6 which terminates in a reduced threaded end 7. Threaded on the portion 6 of shaft 1 and having its inner end abutting against the shoulder 5 is a head 8 secured firmly in place by means of a nut 9 on the reduced end 7 of the shaft.

10 designates a driven member or pulley provided with a groove 11 adapted to receive a belt 12 for transmitting power to the rear wheel of a motor cycle (not shown). The web 13 of the pulley is threaded on its inner diameter to receive a ring 14 supported on balls 15 on the head 8. The outer end of the pulley 10 is closed by means of a plate 16 fixed to the pulley 10 by means of screws 17 and having its inner diameter threaded to receive a ring 18 supported on balls 19 on a ring 20 threaded on the end of the head 8 and secured thereon by means of a nut 21.

The friction disks comprising the clutch members are alternately carried by the pulley 10 and head 8. One set of disks 23 is carried by the pulley 10 and is secured thereto by means of four bolts or pins 24 which pass through perforations in the disks 23 and have their inner ends seated in the pulley 10 and their outer ends seated in recesses in the plate 16, thus preventing any relative revoluble movement of the disks 23 and the pulley 10, but permitting the disks 23 to move longitudinally on the pins. Alternately disposed between the disks 23 are disks 25 carried on the head 8, each disk 25 having a central opening corresponding to the cross sectional outline of the head 8 which is provided with flat faces 26 to prevent turning of the disks 25 on the head.

The disks 23 and 25 are limited in their outward longitudinal movement by means of four set screws 28 threaded into the plate 16 and having their inner ends abutting against the face of the outer disk 23. Jam nuts 29 are provided to prevent movement of the screws 28. Preferably directly opposite the screws 28 are four presser members or dogs 30. Each dog 30 is pivotally mounted on a pin 31 supported in ears 32 formed on the web 13 of the pulley 10. The outer end of each dog 30 is rounded forming a cam face adapted to bear against the face of the inner disk 23. The inner end of each dog 30 is rounded as shown at 33 and is engaged by the rounded face of a thrust ring 35 mounted to freely rotate on balls 36 supported in a ball race formed in a circular nut 37. Secured to the crank case 4 by means of screws 40 is a stationary support or plate 41 having a circular flange 42 fitting over the extension 3 on the crank case. Rotatably mounted on the flange 42 of the plate 41 is a hollow screw member 43 held thereon by means of bolts 44 having enlarged heads 45 bearing against the stepped portion 46 of grooves 47 in the flanged portion of the screw member 43. The screw member 43 is provided with a series of spiral grooves 48 which are engaged by spiral threads or tongues 49 on the nut 37. The nut 37 is prevented from rotating on the screw member 43 by means of lugs 50 which extend into slots 51 in the flange 42 of the plate 41. The screw member 43 may be rotated on the flange 42 by means of an arm 52 formed thereon and connected at its outer end in any suitable manner to proper mechanism (not shown) for operating the same.

The operation of the device is as follows:—When the parts are in the respective positions shown in Fig. 1, with the engine driving the shaft 1 and head 8, together with the disks 25, the pulley 10 is free from the engine shaft, the disks 25 being loose between the disks 23 as the dogs 30 are in inoperative position. That is, the dogs are in such a position that the inner ends of the dogs are nearer the shaft 1, thereby permitting the cam face on the outer end of the dogs to move away from contact with the inner disk 23 in which position the disks 23 and disks 25 are not in frictional contact. When it is desired to clutch the pulley 10 to the driving member or shaft 1 and drive the belt 12, the arm 52 is moved in the direction of the arrow, Fig. 3, thereby turning the screw member 43. The spiral grooves 48 in the screw member 43 cause the nut 37 to move into the position shown in Fig. 2 as the spiral tongues 49 on the nut 37 are in engagement with the grooves 48 in the screw member 43, as clearly illustrated in Fig. 4. The lugs 50 being in the slots 51 in the flange 42 of the plate 41 prevent the nut 37 from rotating with the screw member 43. The ring 35 is carried forward with the nut 37 and moves under the inner ends of the dogs 30, raising the inner end of the dogs and causing the cam face on the outer end of the dogs to press the disks 23 and 25 into tight frictional engagement with each other, thereby locking the pulley to the shaft 1. To release the pulley from the shaft 1, the arm 52 is moved to its original position and the respective parts return to the position shown in Fig. 1, permitting the engine shaft to run free of the pulley and power transmission belt.

What I claim is:—

1. The combination with a driving member and driven member, of means for frictional engagement therebetween, presser members carried on said driven member adapted to engage said frictional engagement means, a stationary member, a member rotatably and non-slidably mounted on said stationary member, a member slidably and non-rotatably mounted on said stationary member, means connecting said rotatable and non-rotatable members, to slide the non-rotatable member on rotation of said rotatable member and thrust means carried by said non-rotatable member, for engaging said presser members to move them into operative relation with said frictional engagement means on the sliding movement of the non-rotatable member.

2. The combination with a driving member and driven member, of means for frictional engagement therebetween, presser members adapted to engage said frictional engagement means, a stationary member, a rotatable screw member on said stationary member, a longitudinally movable nut on said screw member, means for preventing rotation of said nut, and a rotatable thrust ring on said nut adapted to engage the presser members.

3. The combination with a driving member and driven member, of means for frictional engagement therebetween, presser members carried on said driven member adapted to engage said frictional engagement means, a stationary support, a circular flange on said stationary support provided with longitudinal slots, a rotatable screw member on said flange, a longitudinally movable nut on said screw member having lugs projecting into the slots in said circular flange, and a rotatable thrust ring on said nut adapted to engage the presser members.

4. The combination of a driving member and driven member, driving disks carried by said driving member, driven disks carried by said driven member, presser members carried by the driven member adapted to hold the driving disks and driven disks in frictional engagement, a stationary member, a rotatable screw member on said stationary member, a longitudinally movable nut on said screw member, means for preventing rotation of said nut, a rotatable thrust ring on said nut adapted to engage the presser members, and means for operating said screw member.

5. The combination of a driving shaft, a head carried on said shaft, friction driving disks carried on said head, a pulley freely rotatable on said head, friction driven disks carried on said pulley, a plate on the end of said pulley, screws on said plate having their inner ends abutting against the outer friction disk on said pulley, presser members carried by said pulley adapted to engage the inner friction disk on said pulley, and means independent of said driving shaft for operating said presser members to press the friction disks into frictional engagement.

6. The combination of a driving shaft, a head carried on said shaft, friction driving disks carried on said head, a pulley rotatable on said head, friction driven disks carried on said pulley, a plate on the end of said pulley, means on said plate forming abutments for the outer friction disk, presser members carried by said pulley adapted to engage the inner friction disk, a stationary member, a rotatable screw member on said stationary member, a longitudinally movable nut on said screw member, a rotatable thrust ring on said nut adapted to engage said presser members, and means for operating said screw member.

In testimony whereof, I have hereunto set my hand at Los Angeles California this 21st day of December 1910.

FRANK S. JONES.

In presence of—
FRANK L. A. GRAHAM,
P. H. SHELTON.